United States Patent
Mitton (10) Patent No.: US 9,915,361 B2
(45) Date of Patent: Mar. 13, 2018

(54) PULSE VALVE

(71) Applicant: Mitton Valve Technology Inc., Brantford (CA)

(72) Inventor: Michael Jon Mitton, Brantford (CA)

(73) Assignee: MITTO VALVE TECHNOLOGY INC., Brantford, ON (CA)

( * ) Notice: Subject to any disclaimer, the term of this patent is extended or adjusted under 35 U.S.C. 154(b) by 0 days.

(21) Appl. No.: 15/495,285

(22) Filed: Apr. 24, 2017

(65) Prior Publication Data

US 2017/0227133 A1   Aug. 10, 2017

Related U.S. Application Data

(63) Continuation of application No. 15/033,439, filed as application No. PCT/CA2014/000783 on Oct. 31, 2014, now Pat. No. 9,631,732.

(60) Provisional application No. 61/900,539, filed on Nov. 6, 2013, provisional application No. 61/898,833, filed on Nov. 1, 2013.

(51) Int. Cl.
| | |
|---|---|
| *B01F 11/00* | (2006.01) |
| *F16K 11/085* | (2006.01) |
| *B01J 19/00* | (2006.01) |
| *F16K 31/04* | (2006.01) |
| *B01F 5/00* | (2006.01) |

(52) U.S. Cl.
CPC ............ *F16K 11/085* (2013.01); *B01F 5/008* (2013.01); *B01F 11/0071* (2013.01); *B01J 19/008* (2013.01); *B01J 19/0066* (2013.01); *F16K 31/041* (2013.01)

(58) Field of Classification Search
CPC .. F16K 11/0853; F16K 11/085; F16K 31/041; B01D 21/286; B01D 17/042; B01D 17/044; B01D 17/04; B01J 19/1812; B01J 19/0066; B01J 19/008; B01J 2219/24; B01J 2219/00189; B01F 7/00216; B01F 5/008; B01F 11/0071; B01F 15/00006
See application file for complete search history.

(56) References Cited

U.S. PATENT DOCUMENTS

| | | | |
|---|---|---|---|
| 3,608,866 A * | 9/1971 | Karpacheva | ........ B01F 11/0071 |
| 4,511,254 A | 4/1985 | North et al. | |
| 5,137,580 A | 8/1992 | Honda | |

(Continued)

FOREIGN PATENT DOCUMENTS

| | | | |
|---|---|---|---|
| EP | 1 505 323 B1 | 2/2005 | |
| EP | 1505323 A1 * | 2/2005 | .............. F01P 7/167 |

(Continued)

*Primary Examiner* — Charles Cooley
(74) *Attorney, Agent, or Firm* — Kagan Binder, PLLC (57) ABSTRACT

A cavitation reactor having a pulse valve for receiving an input fluid flow and generating a pulsed output flow that is provided to the input of a resonance chamber, such as a tube. The pulse valve uses a shaft with a number of regularly spaced lands to form fluid conduits between an input port and the output port connected to the resonance tube to cause fluid communication between the input and output ports to be regularly opened and closed, thereby producing a pulsed output that drives the formation of resonance waves in the resonance chamber. The shaft is rotated at a suitable frequency to produce cavitation bubbles that collapse in the resonance chamber without damaging the valve shaft.

5 Claims, 8 Drawing Sheets

(56) References Cited

U.S. PATENT DOCUMENTS

| | | | | |
|---|---|---|---|---|
| 5,205,647 A * | 4/1993 | Ricciardi | .............. | B01F 5/0684 366/162.2 |
| 5,467,322 A | 11/1995 | Walter | | |
| 5,519,670 A | 5/1996 | Walter | | |
| 5,626,767 A | 5/1997 | Trampler et al. | | |
| 5,810,474 A * | 9/1998 | Hidalgo | ................ | B01F 5/0683 366/119 |
| 5,868,495 A * | 2/1999 | Hidalgo | ................ | B01F 5/0683 366/119 |
| 6,502,979 B1 | 1/2003 | Kozyuk | | |
| 6,505,648 B1 | 1/2003 | Gergely et al. | | |
| 6,962,169 B2 | 11/2005 | Kaske | | |
| 7,316,501 B2 * | 1/2008 | Thoma | ................ | B01F 3/04531 366/168.1 |
| 7,507,014 B1 * | 3/2009 | League | ............... | B01F 7/00816 366/172.1 |
| 7,806,584 B2 * | 10/2010 | Wootan | ................ | A01K 63/042 366/170.3 |
| 8,430,968 B2 | 4/2013 | Mancosky et al. | | |
| 9,482,365 B2 | 11/2016 | Miller, III et al. | | |
| 9,631,732 B2 * | 4/2017 | Mitton | ................... | B01D 17/04 |
| 2002/0096456 A1 | 7/2002 | Kim et al. | | |
| 2004/0232006 A1 * | 11/2004 | Kazem | ................ | B01F 7/00816 205/687 |
| 2005/0067122 A1 * | 3/2005 | Kazem | ................ | B01F 7/00816 162/29 |
| 2005/0150618 A1 * | 7/2005 | Kazem | ................ | B01F 7/00816 162/50 |
| 2005/0237855 A1 * | 10/2005 | Kozyuk | .............. | B01F 7/00758 366/304 |
| 2007/0041266 A1 | 2/2007 | Huymann | | |
| 2008/0219088 A1 * | 9/2008 | Wood | ................... | B01F 3/04531 366/170.1 |
| 2008/0236160 A1 * | 10/2008 | Glotov | .................... | B01F 5/162 60/530 |
| 2009/0065724 A1 * | 3/2009 | Mitton | .................... | B24C 1/003 251/209 |
| 2009/0120862 A1 | 5/2009 | Lv et al. | | |
| 2009/0143253 A1 * | 6/2009 | Smith | ................... | B01F 3/0446 507/102 |
| 2011/0163012 A1 * | 7/2011 | Gigas | .................. | B01F 7/00775 208/390 |
| 2012/0222744 A1 | 9/2012 | Maslak et al. | | |
| 2012/0247947 A1 | 10/2012 | Mahamuni | | |
| 2016/0167983 A1 * | 6/2016 | Sirok | ........................ | C02F 1/34 422/127 |
| 2016/0175791 A1 * | 6/2016 | Kozyuk | .............. | B01F 7/00816 366/118 |
| 2016/0236158 A1 * | 8/2016 | Bauer | ................... | B01F 5/0608 |
| 2016/0252186 A1 * | 9/2016 | Mitton | ................... | B01D 17/04 |
| 2017/0007976 A1 * | 1/2017 | Kozyuk | ................ | B01J 19/008 |
| 2017/0028375 A1 * | 2/2017 | Kozyuk | ................ | B01J 19/008 |

FOREIGN PATENT DOCUMENTS

| | | | |
|---|---|---|---|
| WO | 2014/189479 A1 | 11/2014 | |
| WO | WO 2014189479 A1 * | 11/2014 | .......... B01F 7/00775 |

* cited by examiner

Fig. 15

PULSE VALVE

PRIORITY CLAIM

This application is a continuation application of U.S. Ser. No. 15/033,439, filed Apr. 29, 2016, now U.S. Pat. No. 9,631,732 B2, which claims benefit from International Application No. PCT/CA2014/000783, filed Oct. 31, 2014, which in turn claims priority to U.S. Provisional Patent Application having Ser. No. 61/900,539, filed on Nov. 6, 2013 and U.S. Provisional Patent Application having Ser. No. 61/898,833, filed Nov. 1, 2013, all of which are incorporated herein by reference in their entireties.

FIELD OF THE INVENTION

The present invention relates generally to liquid treatment systems and methods for removal of unwanted material from the liquid, such as water, and for creating emulsions and suspensions.

BACKGROUND OF THE INVENTION

It is well known that the cavitation in fluids may have useful applications, such as facilitating cell lysis and facilitating the breakdown and flocculation of contaminant particles in fluid so that the contaminants may be separated from the fluid by precipitation of the resulting flocs. However, it has proven difficult to produce a cavitation reactor that can produce cavitation on a commercially useful scale in which the metal components of the reactor are not rapidly damaged and rendered inoperable by the violently collapsing cavitation bubbles.

Cavitation reactors not subject to the above problems would be particularly useful for treating effluents to remove the waste matter in the form of sedimented sludge to recover clean water, and also for processing biomass for purposes of hydrolysis.

SUMMARY OF THE INVENTION

The invention provides a cavitation reactor comprising a pulse valve and a resonance chamber. The pulse valve has a housing and a valve shaft. The housing has a cylindrical bore extending laterally along the axis of the bore, the cylindrical bore being defined by an inner cylindrical surface of the housing. The housing has an input port and a pulse valve output port. Each port provides a separate fluid communication path between an outer surface of the housing and the bore. The bore may have a radius of between 1.0 inches (25.4 mm) and 2.0 inches (50.8 mm), or may have a radius of about 1.5 inches (38.1 mm).

The valve shaft is coaxially positioned in the bore and has a central portion and at least two lands extending radially from the central portion. Each land has a surface and an end proximate to the cylindrical inner surface of the housing. The central portion also has a surface. The valve shaft is rotatable inside the bore around the bore axis. The valve shaft may be rotatable at a rate of between 90 and 200 revolutions per second.

The lands extend laterally, along the bore axis, so that the surfaces of the valve shaft, in combination with the housing, define one or more fluid conduits. Each fluid conduit has a bottom portion defined by the surfaces of two adjacent lands and the surface of the central portion extending between the two adjacent lands.

The valve shaft is continuously rotatable so that each fluid conduit repeatedly moves between a position in which the input port and the pulse valve output port are not in fluid communication with each other, so that the fluid communication path is closed, to an open position in which the input port and the pulse valve output port are in fluid communication with each other, so that the fluid communication path is open and fluid flows from the input port, through the conduit and out the pulse valve output port.

The resonance chamber has a fundamental frequency and the resonance chamber is in fluid communication with the pulse valve output port. The resonance chamber has a resonance chamber output port. The resonance chamber may be a tube, which has proximal and distal ends with the proximal end adjacent to and in fluid communication with the pulse valve output port. The open distal end of the tube is the resonance chamber output port. The tube may be substantially straight and be positioned so that the distal end of the tube is higher than the pulse valve output port.

Continuously rotating the valve shaft results in repeated opening and closing of the fluid communication path so that when fluid is injected into the input port, a pulsed fluid flow is produced at the pulse valve output port, which drives a resonant wave in the resonance chamber, and the fluid moves through the resonance chamber from the pulse valve output port to the resonance chamber output port.

The valve shaft may have a rear disk-shaped plate perpendicular to the bore axis. The rear plate may have a cylindrical outer surface, and be sized so the outer surface of the rear plate is proximate to the cylindrical inner surface of the housing. As a result, fluid cannot pass between the rear plate and the inner surface of the housing. The rear plate may partly define some or all of the fluid conduits.

The valve shaft may have a front disk-shaped plate perpendicular to the bore axis. The front plate may have a cylindrical outer surface, and be sized so the outer surface of the front plate is proximate to the cylindrical inner surface of the housing. As a result, fluid cannot pass between the front plate and the inner surface of the housing. The front plate may partly define some or all of the fluid conduits.

The valve shaft may have one or more disk-shaped separators perpendicular to the bore axis. Each separator may have a cylindrical outer surface, and be sized so the outer surface of the separator is proximate to the cylindrical inner surface of the housing so that fluid cannot pass between the separator and the inner surface of the housing. The separator may partly define some or all of the fluid conduits.

The valve shaft may have exactly three regularly spaced lands and exactly three similarly configured fluid conduits. The fluid communication path between the input port and the pulse valve output port may be opened and closed at a frequency of between 270 Hz and 600 Hz.

The fundamental frequency of the resonance chamber may be adjustable. If the resonance chamber is a tube, the tube may have an adjustable flow valve, wherein when the flow valve is adjusted, the resonant frequencies of the resonance tube are modified. The adjustable flow valve may be located near the distal end of the resonance tube. When fluid is injected through the input port, the fundamental frequency of the resonance chamber may be adjusted to create a resonance wave in the resonance chamber sufficient to cause cavitation bubbles to form in each of the conduits when the conduit has rotated so that the fluid communication path moves from being open to being closed. Then, while the conduit remains in fluid communication with the pulse valve output port, some of the cavitation bubbles may move into resonance chamber where they collapse. When fluid is injected through the input port, the fundamental frequency of the resonance tube may be be adjusted to create a resonance wave in the resonance tube sufficient to cause cavitation bubbles to form and collapse in the resonance tube.

When fluid is injected through the input port, the fundamental frequency of the resonance tube may be adjusted to create a resonance wave in the resonance chamber with a frequency of over 20 KHz.

The bottom portion of each conduit, which bottom has first and second laterally extending ends at the ends of the two adjacent lands, which bottom is bounded by a first land on one side and a second land on the other side, may be smoothly shaped. The valve shaft may have either two or three regularly spaced lands, so that any notional curve extending along the bottom of one of the conduits from the end of the bottom at the first land to the end of the bottom at the second land, along the surfaces of the lands and the central portion therebetween, perpendicular to the bore axis, is continuously differentiable. No two tangents to any such notional curve may be at an angle of 90 degrees or less relative to each other. If the valve shaft has exactly three regularly spaced lands, then no two tangents to any such notional line may be at an angle of 100 degrees or less relative to each other.

The invention also provides a multi-segment pulse valve comprising a housing and a multi-segment valve shaft. The housing has a cylindrical bore having an axis extending laterally, the bore being defined by an inner cylindrical surface of the housing. The housing has an outer surface and at least two pairs of ports, each pair or ports comprising a pulse valve segment input port and a pulse valve segment output port. Each of the ports provides a separate fluid communication path between the outer surface of the housing and the cylindrical bore.

The multi-segment valve shaft is coaxially positioned in the cylindrical bore. It has at least front and rear segments, each segment comprising a central portion and at least two lands extending radially from the central portion. Each land has a surface and an end proximate to the cylindrical inner surface of the housing. The valve shaft is rotatable inside the cylindrical bore around the bore axis by a drive shaft connected to the central portion. Each pair of adjacent segments is separated by a disk shaped separator having a cylindrical outer surface. Each separator is sized so the outer surface of the separator is proximate to the cylindrical inner surface of the housing so that fluid cannot pass between the segments. The lands extend laterally so that a fluid conduit is defined by the surfaces of each pair of adjacent lands in each segment and the central portion therebetween, in combination with the housing and the separators.

Adjacent pairs of ports are laterally spaced apart from each other and positioned so that by rotating the valve shaft, each of the pairs of ports may be brought into fluid communication with each of the fluid conduits of one of the segments. The valve shaft is continuously rotatable so that each fluid conduit in each segment moves between a position in which the pulse valve input port of that segment and the pulse valve segment output port of that segment are not in fluid communication with each other, so that the fluid communication path of that segment is closed, and an open position in which the pulse valve segment input port of that segment and the pulse valve segment output port of that segment are in fluid communication with each other, so that the fluid communication path of that segment is open and fluid flows from the pulse valve segment input port of that segment, through the conduit and out the pulse valve segment output port of that segment.

The segments may be of like size and configuration. The valve shaft may include a third segment positioned between the front and rear segments.

The radial positions of the lands of each segment may be offset from the radial positions of the lands in each adjacent segment, and the lands may be sized and the pulse valve segment input and output ports be positioned so that at most one fluid communication path is open at any time.

The multi-segment pulse valve may also include an output manifold having one manifold input port for each segment, each manifold input port being in fluid communication with one of the pulse valve segment output ports. The output manifold may have a single manifold output port, so that fluid passing out all the pulse valve segment output ports exits the manifold output port. The lands within each segment may be regularly spaced so that when fluid is injected into the input ports, a regularly pulsed fluid flow is produced at the manifold output port.

The multi-segment valve shaft may have exactly three segments, each segment having three regularly spaced lands. The radial positions of the lands of the front segment may be offset from the radial positions of the lands in the third segment by about forty degrees, and the radial positions of the lands of the third segment may be offset from the radial positions of the lands in the rear segment by about forty degrees.

The multi-segment valve shaft may have six segments.

The invention also provides other embodiments of a cavitation reactor comprising a pulse valve and a resonance chamber. The pulse valve includes a valve body and a cylindrical valve shaft. The valve body defines at least one input port and at least one pulse valve output port, each port providing a separate fluid communication path between an outer surface of the valve body and a cylindrical bore extending along an axis defined by the valve body. The cylindrical valve shaft is coaxially positioned within the cylindrical bore. An outer surface of the valve shaft defines a first fluid conduit extending across the bore axis, and defines a second fluid conduit extending across the bore axis, each of the fluid conduits being a conduit for fluid communication between the input port and the pulse valve output port. The valve shaft is operable to rotate at a pre-determined rotational rate so that, when fluid is entering the input port, the conduits sequentially bring the input port and the pulse valve output port through a fluid communication cycle consisting of: (i) a state of an increasing fluid flow; (ii) a state of maximum fluid flow; (iii) a state of decreasing fluid flow, and (iv) a state of minimum or zero fluid flow. The resonance chamber has a fundamental frequency, and is in fluid communication with the pulse valve output port. The resonance chamber has a resonance chamber output port. When fluid is injected into the input port, a pulsed fluid flow is produced at the pulse valve output port, which drives a resonant wave in the resonance chamber, and the fluid moves through the resonance chamber from the pulse valve output port to the resonance chamber output port.

The conduits may be regularly spaced and configured so that when the valve shaft is rotated at a fixed frequency and fluid is input into the input port, a regularly pulse fluid output is produced at the pulse valve output port.

The resonance chamber may be a tube.

The invention also provides other embodiments of a cavitation reactor comprising a pulse valve and a resonance chamber. The pulse valve has a valve body and a cylindrical valve shaft. The valve body defines at least one input port and at least one pulse valve output port. Each port provides a separate fluid communication path between an outer surface of the valve body and a cylindrical bore extending along an axis defined by the valve body. The cylindrical valve shaft is coaxially positioned within the cylindrical bore. An outer surface of the valve shaft defines a fluid conduit extending across the bore axis, the fluid conduit being a conduit for fluid communication between the input port and the pulse valve output port. The valve shaft is operable to rotate at a pre-determined rotational rate so that, when fluid is entering the input port, the conduit sequentially brings the input port and the pulse valve output port through a fluid communication cycle consisting of: (i) a state of an increasing fluid flow; (ii) a state of maximum fluid flow; (iii) a state of decreasing fluid flow, and (iv) a state of minimum or zero fluid flow. The resonance chamber has a fundamental frequency, and is in fluid communication with the pulse valve output port. The resonance chamber has a resonance chamber output port. When fluid is injected into the input port, a pulsed fluid flow is produced at the pulse valve output port, which drives a resonant wave in the resonance chamber, and the fluid moves through the resonance chamber from the pulse valve output port to the resonance chamber output port. The resonance chamber may be a tube. The pulse valve may have exactly one fluid conduit.

BRIEF DESCRIPTION OF THE DRAWINGS

FIG. 2b is a rear perspective view of the embodiment of the pulse valve housing shown in FIG. 2a.

FIG. 3 is a top view of the pulse valve housing of FIG. 2a.

DETAILED DESCRIPTION OF THE INVENTION

Figure 1:
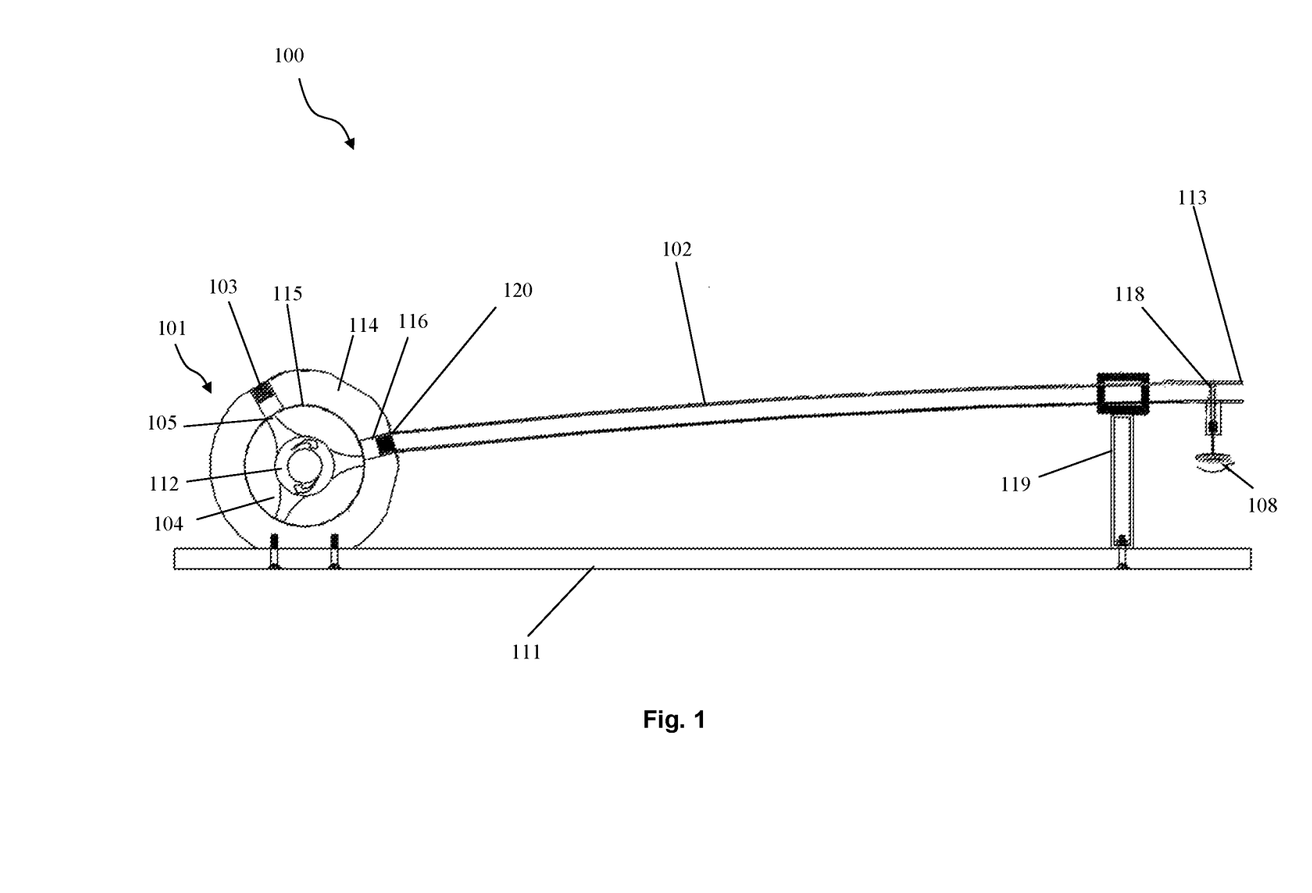
FIG. 1 is a side cross-sectional view along the longitudinal axis of an embodiment of a cavitation reactor in which the resonance chamber is a tube.

A preferred embodiment of the cavitation reactor is shown in FIG. 1. The cavitation reactor 100 includes a pulse valve 101 and a resonance chamber, which in the depicted embodiment is a tube 102 having a proximal end 120 and a distal end 113. The pulse valve 101 is attached to a suitable level platform 111, and the tube 102 is also supported by a support 119 that is attached to the platform 111. The pulse valve 101 of FIG. 1 has a generally cylindrical single-segment valve housing 114 extending laterally along a bore axis perpendicular to the view shown in FIG. 1 through the centre of the housing 114. The housing 114 has a cylindrical bore defined by a smooth cylindrical inner surface 115 of the housing 114.

Figure 2A:
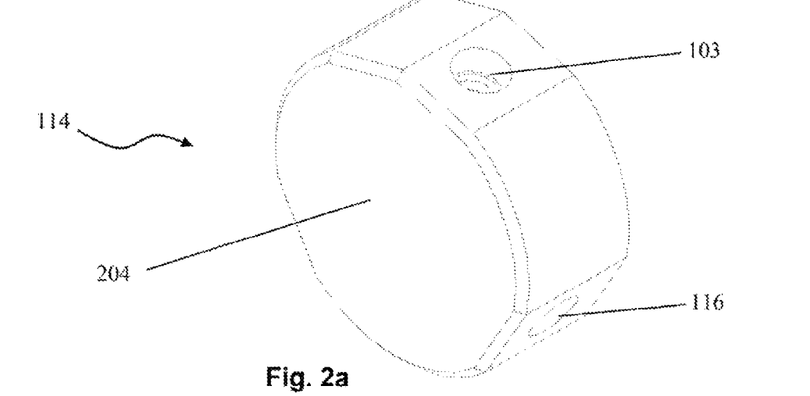
FIG. 2a is a front perspective view of an embodiment of a pulse valve housing configured for a single-segment valve shaft.
Figure 2B:
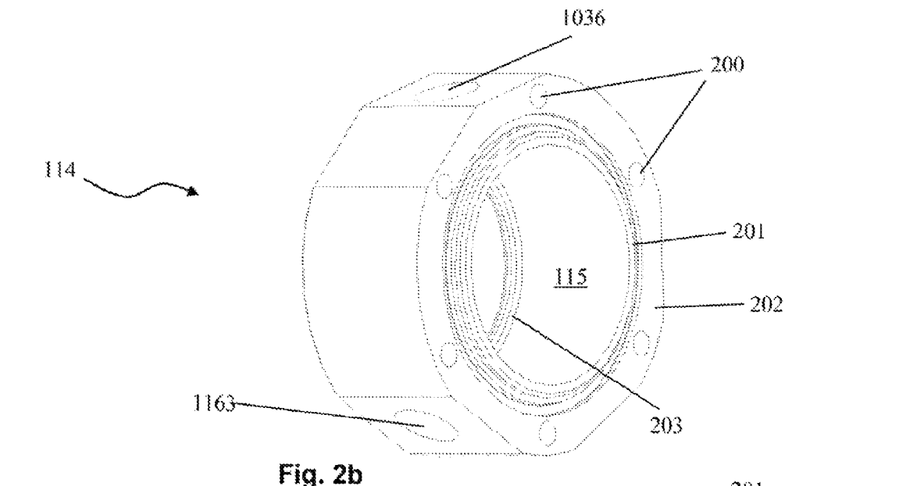
Figure 3:
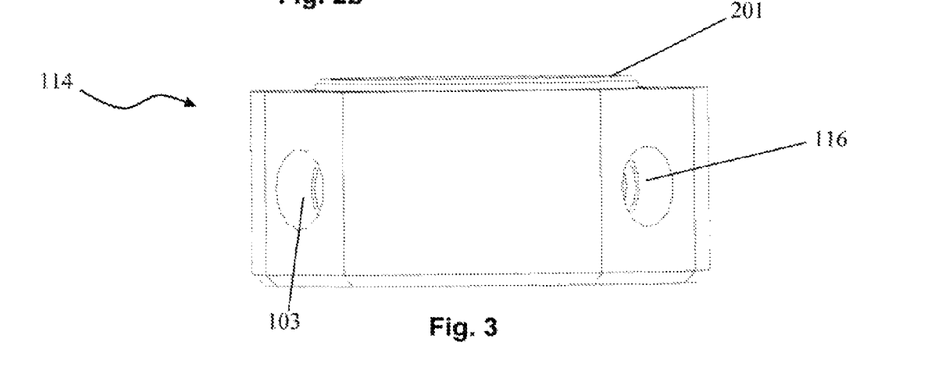

A single-segment housing 114 is shown in isolation in FIGS. 2a, 2b and 3. The six depicted connection points 200 are configured to permit a drive housing, such as the housing 603 shown in FIG. 8b, to be attached to the rear of the valve housing 114.

The housing 114 has an input port 103 which is typically a cylindrical opening that is in fluid communication with the bore so that fluid, such as water, can flow into the bore through the input port 103. The housing 114 also has a pulse valve output port 116 so that fluid inside the bore can flow out the pulse valve output port 116 when a fluid communication path between the input port 103 and pulse valve output port 116 is open. The pulse valve output port 116 is also typically a cylindrical opening with a diameter equal to the diameter of the input port 103. The pulse valve output port 116 is preferably the same diameter as the inner diameter of the resonance tube 102. In the configuration shown in FIG. 1, the valve shaft rotates clockwise.

In the embodiment depicted in FIGS. 1-3, the input port 103 and pulse valve output port 116 each span about 20 degrees (referring to the 360 degrees about the bore axis), although this particular size is not essential. The perpendicular distance between the bore axis and the inner surface 115 of the housing 114 is referred to as the radius of the bore, which may also be referred to as the radius of the valve shaft segment 405. In a preferred embodiment, the radius of the bore is about 1.5 inches (38.1 mm) so that its diameter is about 3.0 inches (76.2 mm). Larger bores, such as a bore with a 2.0 inches (50.8 mm) radius, may be used, but it is believed that such larger bore sizes are not as effective in producing cavitation, which is desirable, as discussed below, because they are more difficult to drive at a suitably high rotational rate. Smaller bore sizes, such as a bore with a 1.0 inches (25.4 mm) radius, may also be used, but the resulting pulse valves have a lower throughput capability. The width of the bore (front to rear distance along the bore axis) in a single-segment embodiment may be about 2.125 inches (54.0 mm) to 2.25 inches (57.2 mm) at the front edge 201 adjacent the inner surface 115 of the bore. The rear edge 201 of the bore may extend rearward somewhat more than the rest of the rear side of the housing 114 to form a relatively thin annulus with a flat rear-facing surface perpendicular to the bore axis for contacting the drive housing (not shown) when in operation to help provide a liquid-tight seal. The throughput capacity of a typical single-segment pulse valve with two lands/conduits is about 15 to 25 liters per minute.

Within the bore a valve shaft segment 405 is disposed, which is connected to a drive (not shown) via a drive shaft 402. A single segment valve shaft 400, compatible with the housing 114 shown in FIG. 2, is shown in FIG. 4 in a perspective view and in FIG. 5 in an end view.

The drive rotates the valve shaft 400 about the bore axis at selectable fixed rotational rates, such as from 5500 to 12000 revolutions per minute, or about 90 to 200 revolutions per second. The valve shaft 400 has a central portion 112, through which the bore axis passes, and a number of regularly spaced lands 105. Generally two or three lands are employed. The embodiment depicted in the figures has three lands 105. The lands 105 are separated (at their mid-points) by 120 degrees. It is very preferable that the lands are regularly spaced and configured so that they form regularly sized and spaced fluid conduits, so as to produce a fixed pulse rate output. Variants where the lands are not regularly spaced are possible, but not preferred.

Figure 4:
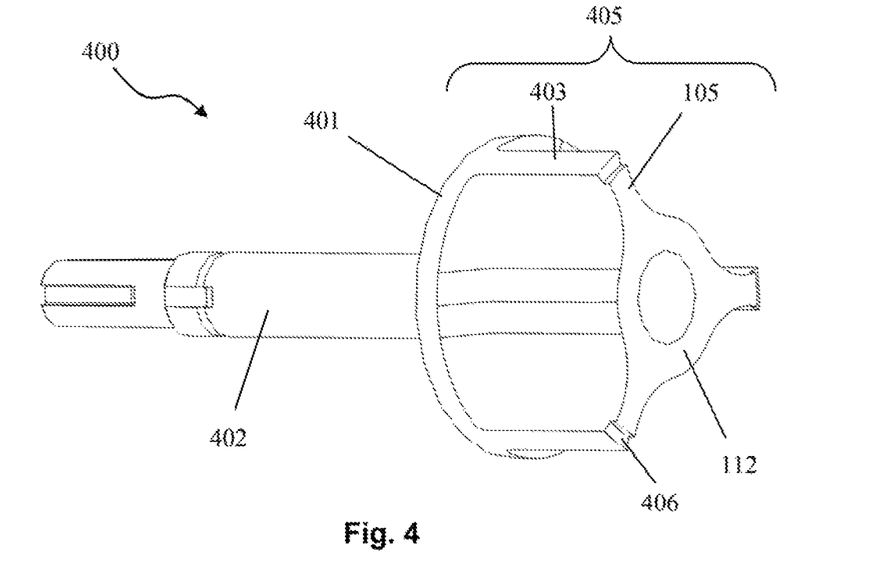
FIG. 4 is a perspective view of an embodiment of a single-segment valve shaft.
Figure 5:
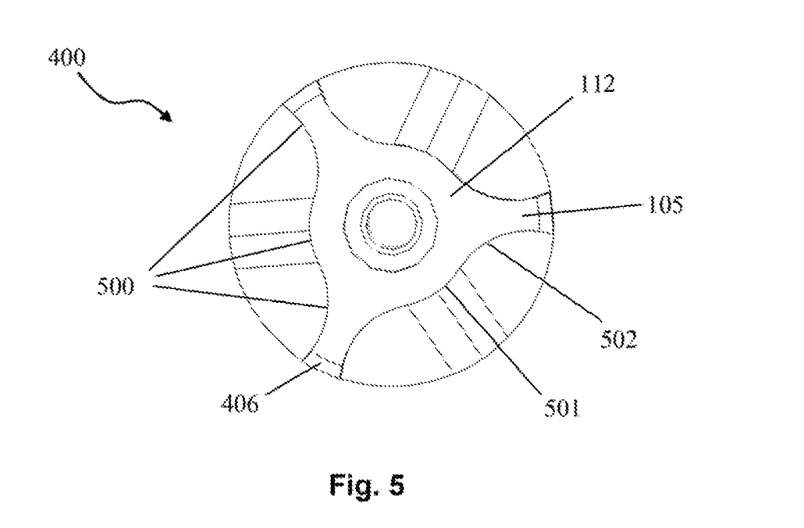
FIG. 5 is an end view of the single-segment valve shaft of FIG. 4.

The lands may be tapered as shown in FIGS. 1, 4 and 5, so that the outer end 403 of each land spans about 10 degrees about the bore axis. The lands 105 extend radially from the central portion 112 of the valve shaft segment 405 so that outer end 403 of each land 105 is proximate to the inner surface 115 of the housing 114 along the lateral extent of the lands 105. The lands 105 extend laterally (in the direction of the bore axis) across the width of the bore, so that they span the input port 103 and the pulse valve output port 116, and the front sides of the lands 105 are very close to the inner surface of the front of the housing 114, typically with about $5/1000$ of an inch (0.13 mm) or less end play. The rear end of each land 105 is attached to, and preferably integrally formed with, a back plate 401 that is attached to the drive shaft 402, and may be integrally formed with the drive shaft 402. Alternatively, the shaft may be splined for releasable attachment to the valve segment 405. The back plate 401 and lands 105 are each sized to have a radius substantially equal to, but slightly less than, the radius of the bore, generally providing up to $2.5/1000$ inches (0.064 mm) clearance or play between the outer edge of the back plate 401 and the inner surface 115 of the bore, so that fluid cannot pass out from a conduit over the back plate 401, or between the ends 403 of the lands 105 and the inner surface 115 of the bore, so that fluid in each conduit 104 cannot pass over the ends of the lands 105 to enter an adjacent conduit, when the valve shaft segment 405 is disposed inside the bore.

Figure 12:
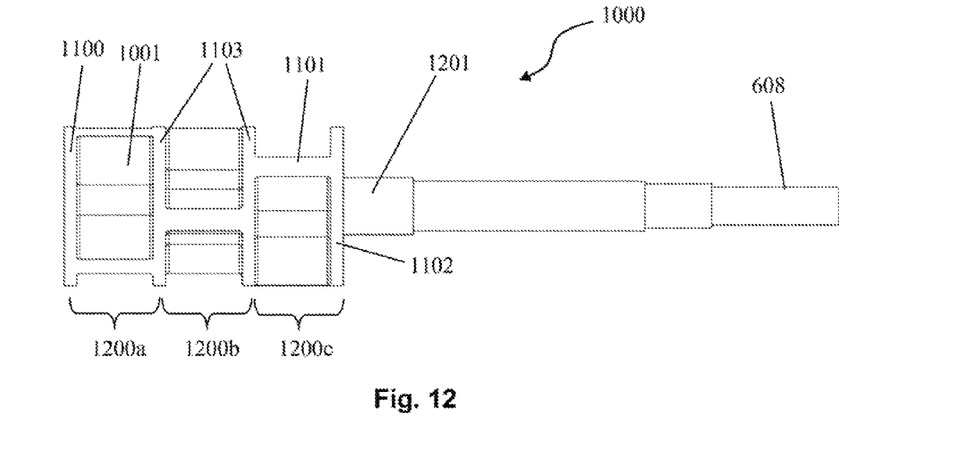
FIG. 12 is a side view of the three-segment valve shaft shown in FIG. 11.
Figure 13:
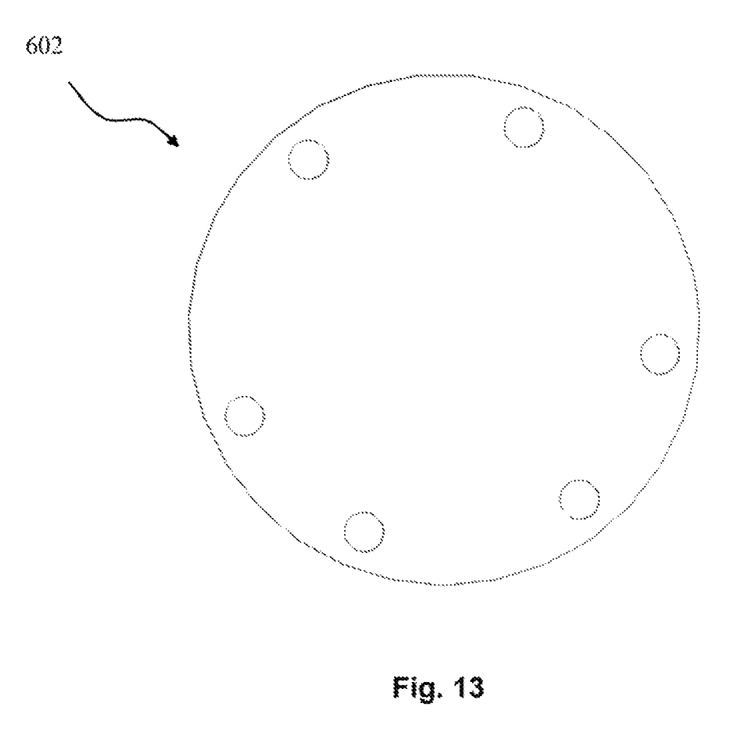
FIG. 13 is a plan view of the front face plate 602 of FIG. 6 shown in isolation.

In the embodiment shown in FIG. 4, the valve shaft segment 405 includes three regularly spaced lands 105 extending from the inner portion 112 and their rear portions being integrally formed with the back plate 401. In other embodiments, a valve shaft segment may further include a front plate attached to, and preferably integrally formed with, the front portions of the lands 105 (for example, this may be similar to the front segment 1200*a* shown in FIGS. 11 and 12, which has a front plate 1100). Such a front plate prevents blow-by (leaking of fluid between conduits) and then allows the housing to have a flat inner surface, such as shown in FIG. 13.

The valve segment 405 of the particular embodiment shown in FIG. 4 has a front end with a flat surface, all points on the front surface being in the same plane perpendicular to the bore axis other than recessed portions 406 near the end 403 of each land 105. This recessed portion 406 corresponds to a complementary configuration of the inside front portion of the housing 114, which has a raised outer portion 203 having a flat surface perpendicular to the bore axis and a height and width equal to the height and width of the recessed portion 406. This configuration is an alternative approach to preventing blow-by.

A drive housing (not shown), or similar structure that allows the drive shaft 402 portion of the valve shaft 400 pass through it, is secured to the rear side of the housing and configured to engage the rear side of the housing 114 to form a liquid-tight seal when the valve shaft segment 405 is disposed in the bore. This may be similar to the drive housing 603 described below and shown in FIGS. 8*a* and 8*b*.

The outer surface of the central portion 112 of the valve segment 405 and the adjacent surfaces of each pair of adjacent lands 105, in combination with portions of the inner surface of the front plate 204 of the housing 114 and the back plate 401 of the valve shaft 400 together define a fluid conduit 104. The valve shaft segment 405 and housing are configured, as described above, so that little or no fluid can pass between the conduits 104, but as the valve shaft 400 rotates, the input port 103 and pulse valve output port 116 are regularly opened to each of the conduits 104. As a result, when the input port 103 and pulse valve output port 116 are both simultaneously at least partially open to one of the conduits 104, liquid injected through the input port 103 into the conduit 104 necessarily results in a corresponding amount of liquid inside the conduit 104 being forced out the pulse valve output port 116 and into the resonance tube 102.

In the depicted configuration, the input port 103 and pulse valve output port 116 are spaced apart by about 105 degrees (centre to centre), which is suitable for use with a three-conduit valve shaft segment 405. As a result, as the valve shaft 400 rotates, fluid communication between the input port 103 and pulse valve output port 116 is open (through one of the conduits 104) for about 25 degrees of rotation and is closed for the next 95 degrees of rotation. This repeats three times during each full rotation of the valve shaft 400, so that when fluid is injected into the input port 103, it results in a pulsed output flow through the pulse valve output port 116 with a pulse rate of three times the rotational frequency of the valve shaft 400. For example, if the valve shaft rotates at 120 to 200 revolutions per second, the output flow is pulsed at 360 to 600 Hz.

In this particular configuration, each conduit 104 spans about 110 degrees so that, while there is fluid communication between the input port 103 and pulse valve output port 116 for about 25 degrees, the input port 103 and pulse valve output port 116 are fully open to the conduit simultaneously for only about 5 degrees, while during the first 10 degrees of each fluid communication (the first period), the output port is increasingly exposed to the conduit, as the flow rate increases, until it is completely exposed, and during the last 10 degrees of each fluid communication (the third period), the input port is decreasingly exposed to the conduit, as the flow rate decreases, until it is completely unexposed and the fluid communication is ended and the flow rate goes to a minimum flow level or, preferably, zero. The amount of fluid passing from the input port 103 to the pulse valve output port 116 thereby generally increases from zero at the beginning of the first period to a maximum flow at the beginning of the second period, during which second period both the input port 103 and pulse valve output port 116 are fully open to the conduit for about 5 degrees, and during the third period the amount of fluid passing from the input port 103 to the pulse valve output port 116 generally decreases from the maximum flow to zero to the end of the third period.

Figure 14:
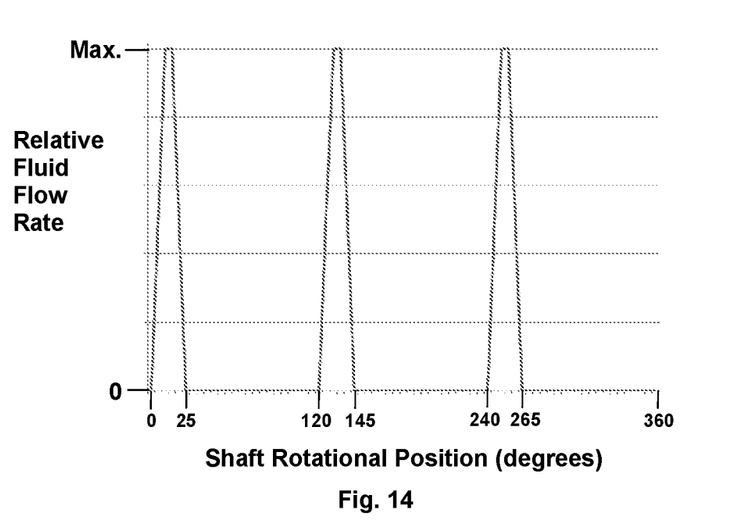
FIG. 14 is a graph showing the relative throughput of an embodiment of a pulse valve with a single-segment valve shaft.

FIG. 14 shows the relative fluid flow rate of fluid passing through the input port 103 and out the pulse valve output port 116 (vertical axis) for a single-segment three-land/conduit pulse valve as a function of the rotational position of the valve shaft (horizontal axis). The maximum flow rate is referred to as "Max.", which corresponds to the approximately 5 degrees in each rotation during which both the input port 103 and pulse valve output port 116 are fully open to one of the three conduits (second period) in a three-conduit configuration with the lands regularly spaced apart by 120 degrees (centre to centre). Each of the three pulses in the depicted single rotation of the valve shaft corresponds to one of the three conduits.

The particular configurations described above are only some possible preferred embodiments. Any configuration that facilitates fluid communication between the input port 103 and out the pulse valve output port 116 is possible. For example, it is not necessary that both the input port 103 and pulse valve output port 116 be fully open to each conduit at the same time for any particular period, or even that they are both fully open to one of the three conduits at the same time at all.

Although it is not preferred, the outer surface of the valve shaft may define a single fluid conduit extending across the bore axis. Such a valve shaft also has two lands, at the two ends of the fluid conduit defined by the surface of the valve shaft, the two lands preferably being separated by less than 90 degrees, with the outer surface of the remainder of the valve shaft being cylindrical and proximal to the inner cylindrical surface of the housing.

In general the resonance chamber has a fundamental (or "natural") frequency, which is the lowest frequency at which it resonates. For example, for a tube 102 that is 0.5 m (500 mm) in length, the fundamental frequency may be about 1400 Hz, assuming the speed of sound in the fluid is approximately 1500 m/s and that the distal end 113 of the tube 102 is open. When fluid is injected into the input port 103, for example at a pressure of 100 PSI (690 kPa), and the valve shaft rotates at 166.7 revolutions per second, a driving pulse frequency of about 500 Hz is presented at the pulse valve output port 116. As the fluid flows into the tube 102, the driving frequency may result in the formation of one or more resonance waves in the resonance tube 102. Such waves may have a dominant frequency of approximately the least common multiple of the driving pulse rate and the fundamental frequency of the tube 102. In the example described, the dominant frequency of the resonant wave may be about 7000 Hz, being the least common multiple of 500 Hz and 1400 Hz, although generally there will be multiple resonant frequencies with varying intensities.

In the embodiment shown in FIG. 1, the resonance tube 102 has a pinch valve 118 near the distal end 113 which can be adjusted by a handle 108 under the tube 102 so that the upper portion of the tube remains open as long as the valve 118 is not completely closed. Generally, when the handle is turned from one position to a more closed position in which the output aperture size is reduced, the fundamental frequency of the tube 102 is reduced. For example, if the fundamental frequency is about 1400 Hz when the pinch valve is in a fully open configuration, in which the output aperture size is approximately equal to the cross-sectional area of the tube 102, then it may decrease below 1400 Hz as the value is closed and the aperture size is reduced. As the fundamental frequency is changed by manipulating the pinch valve, the resonant wave frequency/frequencies is/are also changed so that they are approximate common multiples of the modified fundamental frequency and the driving pulse rate. By adjusting the pinch valve, one can then select a particular dominant resonant frequency, for example by monitoring the intensity of the sound over a range, such as 0-40 KHz, or 0-100 KHz, for example, with a spectrum analyzer. For example, it has been found that dominant resonant wave frequencies of 20 KHz to 26 KHz are particularly useful for inducing cavitation, although higher and lower frequencies may be used also.

The resonant wave comprises a sequence of compression nodes and rarefactions, or compression anti-nodes. Generally anti-nodes may be located at the proximal and distal ends of the tube, and occur once per wavelength. Similarly, pressure nodes appear at the same interval from each other. When there are N pressure nodes, N being a positive integer, the resonant wave frequency is equal to N times the fundamental frequency (i.e. the $N^{th}$ harmonic).

It has been observed that, when fluid is flowing as described above, and a suitable dominant resonant wave frequency, such as 21.5 KHz, is attained by manipulation of the pinch valve handle 108, cavitation bubbles are created in the conduit 104 currently in fluid communication with the pulse valve output port 116 after the fluid communication between the input port 103 and the pulse valve output port 116 is closed. The bubbles may be caused by the decrease in pressure that occurs at this point, and the bubbles may move towards the pressure anti-node near the proximal end of the tube 102, and into the tube 102. It has been observed that the bubbles generally do not collapse adjacent to the lands 105 or central portion 112, or at least sufficiently few bubbles collapse inside the pulse valve very close to the inner surfaces, so that bubble collapse does not significantly damage the valve shaft segment 405 or other portions of the pulse valve. This may be because of the nature of the fluid flow resulting from the operation of the valve, based on the configuration of the conduits 104, and may also relate to a lack of significant pressure increase in the conduit 104. Generally the cavitation bubbles are drawn into the tube 102, where they collapse, for example when they approach the first pressure node of the resonant wave. It is believed that the efficiency of the valve, and its resistance to cavitation damage is facilitated by having a smooth shaped bottom portion 500 formed from the surfaces of the central portion 112 and lands 105, such as shown in FIG. 5.

However, any shape of conduit that provides a fluid communication path between the input port 103 and the pulse valve output port 116 for at least a portion of each rotation of the valve shaft may be employed. The particular shape of the bottom of each conduit shown in FIG. 5 is referred to herein as a "smooth W shape". While this "W" shape has a higher portion 501 adjacent to two lower portions 502, this is not essential, and a more "U" shaped conduit may also be employed. It is generally preferred that the curvature of the bottom of each conduit be smooth, meaning that in any notional line extending from the end of the first land adjacent to a conduit 104, along the surface 501 of the central portion 112, perpendicular to the bore axis, to the end of the second land adjacent to the conduit 104 be a continuously differentiable curve, and more preferably have no two tangents to the notional line being at an angle of 90 degrees or less relative to each other. For embodiments where the input port 103 and pulse valve output port 116 are aligned (i.e. at the same lateral position along the bore axis, as is shown in the figures) and having regularly spaced lands, this requires that no more than three lands/conduits be present in the valve shaft segment 405. More preferably, in a three-conduit configuration, no two tangents to such a notional line are at an angle of less than 100 to 110 degrees relative to each other, and in a two-land configuration, no two tangents to such a notional line are at an angle of less than 150 to 170 degrees relative to each other.

The resonant waves in the tube 102 may lead to further production of cavitation bubbles near the pressure anti-nodes that may then collapse as they approach a pressure node as the fluid progresses through the tube 102. The cavitation in the resonance chamber may support functions such as the oxidation and flocculation of contaminants, leading to their subsequent precipitation out of the fluid.

For example, with a driving pulse frequency of 500 Hz and a resonant frequency of 1344 Hz, a resonant wave with a frequency of about 21.5 KHz may be produced in the tube 102, corresponding to the $17^{th}$ harmonic. In a tube of length 0.5 m (500 mm), such a wave has a wavelength of about 29.4 mm. It is believed that the resonant wave results in bubble formation ("nucleation") and subsequent bubble collapse along the length of the resonance tube 102 as discussed above.

The fluid may be water, or another liquid, with various particles in suspension, which may be one or more contaminants. The presence of such particles may promote nucleation when the pressure in the conduit 104 drops or towards pressure anti-nodes in the resonance tube 102. The fluid may alternatively or additionally contain another fluid in an emulsion (for example, oil droplets in water).

As is well known, cavitation bubble collapse results in extreme changes in temperature and pressure in the region of collapse, and may ionize molecules of the fluid (such as creating hydroxyl ions, $OH^-$, and protons, $H^+$, in the case of water, as well as other well-known ions or "radicals") as well as rupturing any neighboring particles in the fluid, such as bacteria or plant material.

The rupturing of such particles in the presence of ions may result in their oxidation, and the resonant wave may promote flocculation of the particle by-products. The flocs, having a density greater than that of the fluid carrier and being of sufficient size so that gravitational force dominates, may then precipitate out of the fluid, so that the fluid may be readily recovered separately from the flocs.

It has been found that it is preferable to have the cavitation tube 102 configured to slope upward from the pulse valve output port 116 towards the distal end 113 of the tube 102 as larger bubbles (generally substantially larger than the cavitation bubbles) tend to form on the upper inside surface of the tube 102. By having the tube 102 slope upward, the larger bubbles naturally move along the inner surface of the tube 102 and out the distal end 113 of the tube 102. This can be achieved, for example, by selecting a sufficiently high tube support 119 placed towards the distal end 113 of the tube 102. For the same reason, as mentioned above, it is preferred that the pinch valve 118 near the distal end 113 is configured so that it can be adjusted by a handle 108 under the tube 102 so that the upper portion of the tube remains open as long as the valve 118 is not completely closed so that the bubbles on the upper inside surface of the tube 102 can pass by the valve's location.

Figures 6, 7, 8A, 8B:
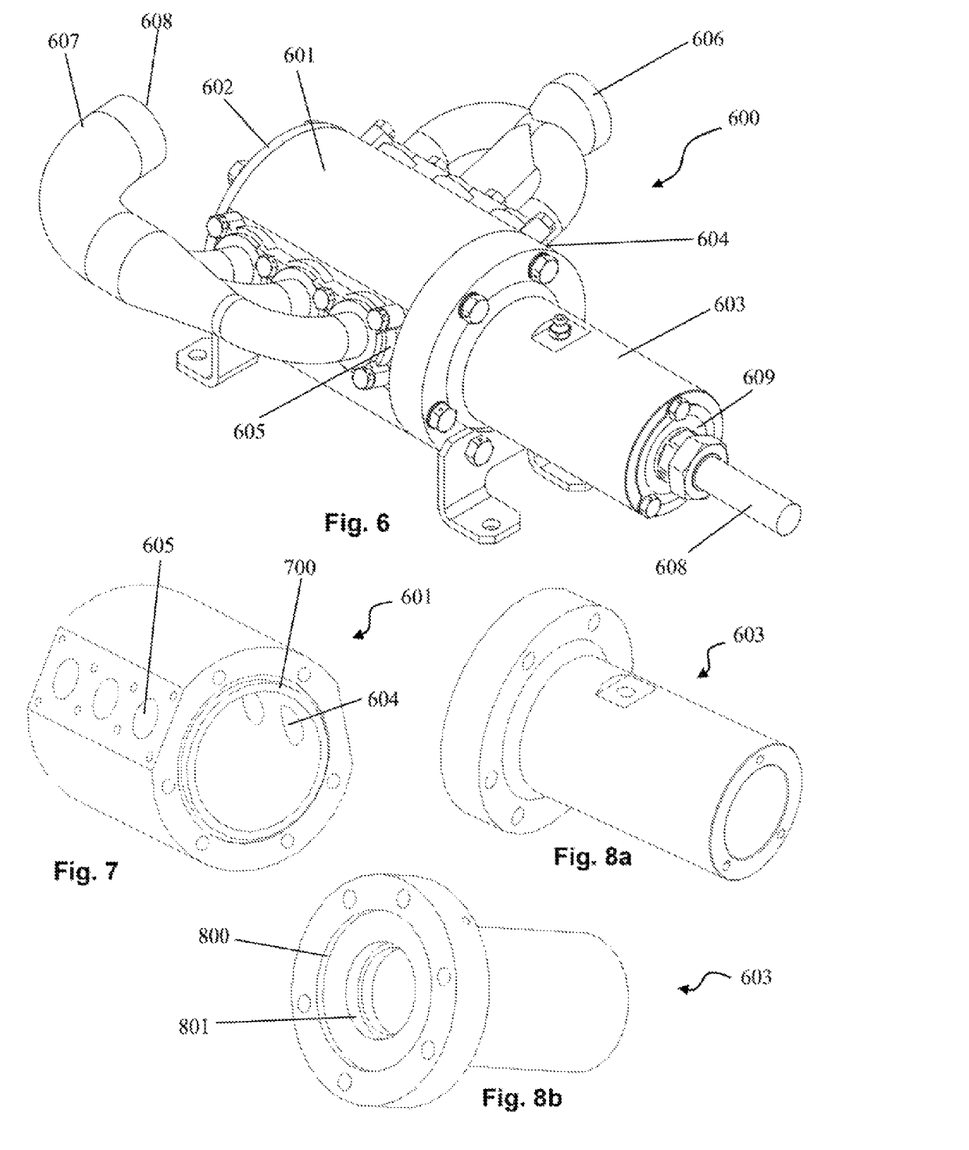
FIG. 6 is a perspective view of an embodiment of a pulse valve with a three-segment valve shaft.
FIG. 7 is a perspective view of the valve housing of the pulse valve shown in FIG. 6.
FIG. 8a is a rear perspective view of the drive housing of the pulse valve shown in FIG. 6.
FIG. 8b is a front perspective view of the drive housing of the pulse valve shown in FIG. 6.
Figure 9:
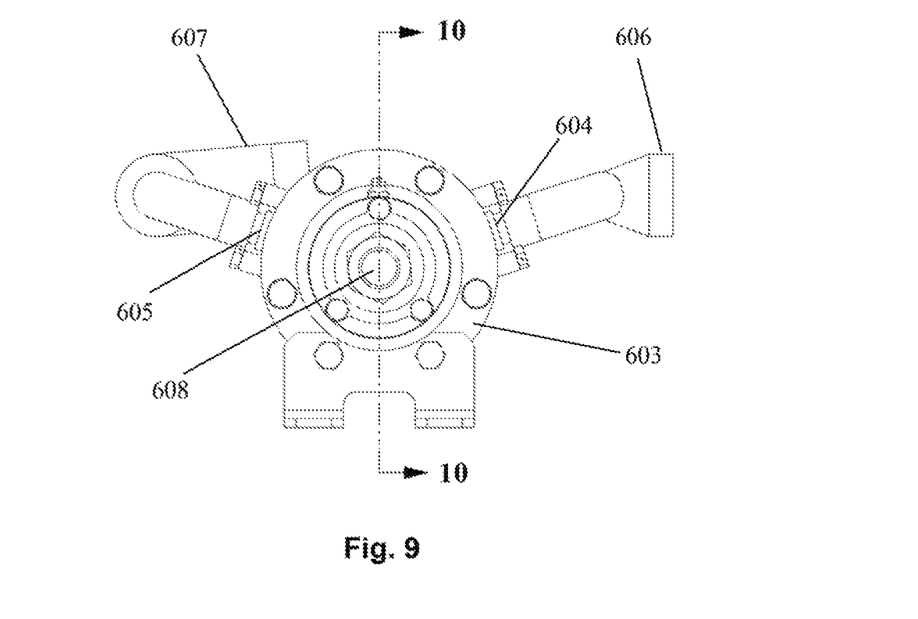
FIG. 9 is a rear view of the pulse valve shown in FIG. 6.
Figure 10:
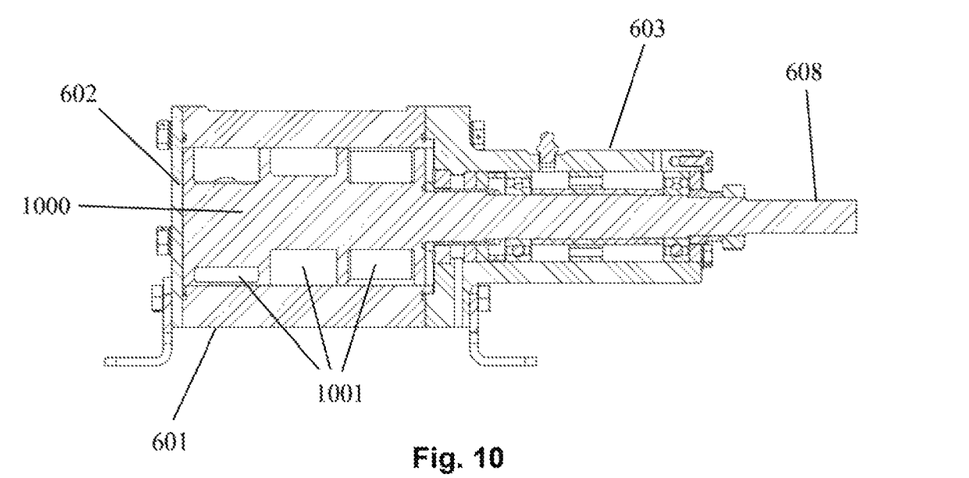
FIG. 10 is a cross-section view of the pulse valve shown in FIG. 6 through the line 10-10 of FIG. 9 showing a three-segment valve shaft disposed in the valve housing.

In another preferred embodiment, a cavitation reactor may employ a pulse valve 600 having three segments, although embodiments with a total of one, two, four, five, six, seven, eight or more segments are also possible. Such a pulse valve 600 may be used for other purposes, separate from a cavitation reactor, where a very high output pulse rate is desired. A pulse valve 600 with three segments is shown in FIG. 6. This employs a valve shaft 1000 with a rear end 608, such as that shown in FIGS. 11 and 12. The three valve shaft segments are indicated as items 1200a, 1200b and 1200c in FIG. 12. In the depicted embodiment each valve shaft segment has three regularly spaced lands 1101, each segment being generally similar to the segment 405 in the single segment valve shaft 400 shown in FIGS. 4 and 5.

Generally it is preferred that each segment have two or three regularly spaced and shaped lands and conduits, although it possible that more could be employed. However, with any number of segments (e.g. 1 to 8) it is not preferred to employ four or more conduits per segment because the angular distance between the input and output ports may thereby have to be less than 90 degrees (and tangents to a path along the bottom of the conduit, as discussed above, would be at angles of 90 degrees or less), which does not allow for smooth flow of fluid through the conduit so that cavitation bubbles are produced in a manner preventing damage to the surfaces of each valve shaft segment inside each conduit, although such configurations could be employed for some purposes. It should be noted that the corresponding input and output ports do not need to be aligned so that they are at the same position along the bore axis (i.e. they may be laterally displaced or offset). Such configurations could facilitate the better use of a four-conduit embodiment, for example, but this is not preferred.

The pulse valve 600 includes a pulse valve housing 601, which is shown in isolation in FIG. 7. The valve shaft 1000 is inserted into and remains disposed within the pulse valve housing 601, with the front face 1100 of the front segment 1200a disposed very close to a flat inner portion of a front face plate 602. The front face plate 602 is shown in isolation in FIG. 13. Typically there may be about $5/1000$ of an inch (0.13 mm) or less end play between the front face 1100 of the front segment 1200a and the flat inner portion of the front face plate 602, although this is not essential.

The front face 1100 of the front segment 1200a, which may be referred to as a front plate, is preferably integrally formed with rest of the front segment 1200a. However, rather than having an integral front plate 1100, the same approach described above for a single-segment valve segment 405 can be employed, whereby the inner surface of the front of the housing is configured to form a liquid-tight seal with an open ended front segment, and so define the front portions of the conduits 1001 in the front segment 1200a.

The rear segment 1200c has a back plate 1102 like the back plate 401 of the single-segment valve segment 405, which back plate 401 is preferably integrally formed with the rest of the segment. However, as with the front plate 1100, the inner surface of the rear of the housing could be configured to achieve the same result.

The front plate 1100 and back plate 1102, when present, as well as the lands 1101, are each sized to have a radius substantially equal to, but slightly less than, the radius of the bore, generally providing up to $2.5/1000$ inches (0.064 mm) clearance or play between the outer edge of the back plate 1102 and the inner surface of the bore, so that fluid cannot pass out from a conduit over the back plate 1102, or between the ends of the lands 1101 and the inner surface of the bore, so that fluid in each conduit 1001 cannot pass over the ends of the lands 1101 to enter an adjacent conduit.

Adjacent segments are separated by a separator 1103, which is preferably integrally formed with the segments. As with the front and back plates, each disk-shaped separator 1103 has a radius substantially equal to, but slightly less than, the radius of the bore, generally providing up to $2.5/1000$ inches (0.064 mm) clearance or play between the outer edge of the separator 1103 and the inner surface of the bore, so that fluid cannot pass out from a conduit over the separator 1103 into a conduit in an adjacent segment. An embodiment with two segments employs one separator, whereas the depicted embodiment 1000 with three segments 1200 employs two separators 1103. In general embodiments with N segments employ N−1 separators.

A drive housing 603 with a drive housing back plate 609, the housing 603 shown in isolation in FIGS. 8a and 8b, may be configured to house a motor drive (not shown) for rotating the drive shaft, and to attach to the rear end of the valve housing 601. The drive housing 603 has a bore 801 designed to allow the front portion 1201 of the drive shaft to pass through with minimal clearance, such as up to $2.5/1000$ inches (0.064 mm). The drive housing 603 is configured to be bolted to the rear end of the valve housing 601, as shown in FIG. 6, so that an annular lip 700 is received by a recess 800 in the front end of the drive housing 603.

The valve housing 601 comprises a bore of similar radius/diameter to that of a single segment valve shaft (preferably with a radius of about 1.0 inches (25.4 mm) to 2.0 inches (50.8 mm), and more preferably about 1.5 inches (38.1 mm)), but is about three times wider to accommodate the three segments 1200 of the valve shaft 1000, each of which are preferably of like size and configuration. The valve housing 601 has three sets of input port 604 and output port 605 pairs, each pair being configured similarly to the input port 103 and pulse valve output port 116 of the single segment pulse valve described above, and generally being at the same lateral position relative to the bore axis. The pairs are spaced radially apart so that each pair opens to one of the three segments 1200, and is part of the fluid communication paths formed by the conduits 1001 of that segment. As the valve shaft 1000 is rotated at a fixed frequency, the regularly spaced conduits 1001 repeatedly and regularly cause fluid communication to be opened and closed between each segment input port 604 and the corresponding segment output port 605 so that as fluid is provided to the input ports 604, a regularly pulsed output is produced by each of the segments 1200 at its output port 605.

The locations of the lands 1101 in each segment 1200 are preferably offset from the adjacent segments. For example, with three conduits, the lands 1101 are spaced apart radially from each other in the same segment by 120 degrees. With three segments 1200, the lands in the second segment 1200b may be radially offset from those in the first (front) segment by 40 degrees, and then the lands in the third (rear) segment 1200b may be radially offset from those in the second segment by 40 degrees, so that the lands in the first segment 1200b are radially offset from those in the third segment also by 40 degrees. If the lands are configured to cause the corresponding input and output ports to be in fluid communication for 20 degrees of rotation, for example, then the three segment pulse valve will produce an output pulse rate of three times that of the single segment pulse valve operating at the same shaft rotation rate, in addition to being able to handle three times the flow rate, where the segments are the same size as the single segment embodiment.

While it is preferred that the lands be regularly radially offset between segments, so as to result in a regular output pulse rate, in some cases some segments may have the same land/conduit configuration with no relative offset. For example, with a six-segment configuration, the first three segments may be as described above (with a 40 degree offset from segment to segment) and the next three segments may be configured identically to the first three segments, so that output pulse from the first and fourth occur at the same time (and similarly for the second and fifth, as well as the third and sixth segments). Any such configuration that results in a regular aggregate pulsed output at the output manifold output port is preferred. More preferably, the configuration also results in the pulses being separate so that the flow is reduced to a low or zero level between pulses.

The three pulse valve input ports 604 are connected to a common fluid source by an input manifold 606, and the three output ports 605 are connected to a common manifold fluid output port 608 by an output manifold 607, which connects to, and is in fluid communication with, the resonance chamber. In the depicted configuration the output manifold 607 curves around so that its output port 608 opens in the same direction as the input port of the input manifold 606, but this is not essential. More generally, the output manifold has one manifold input port for each of the pulse valve output ports, and the input manifold has one manifold output port for each of the pulse valve input ports.

Figure 11:
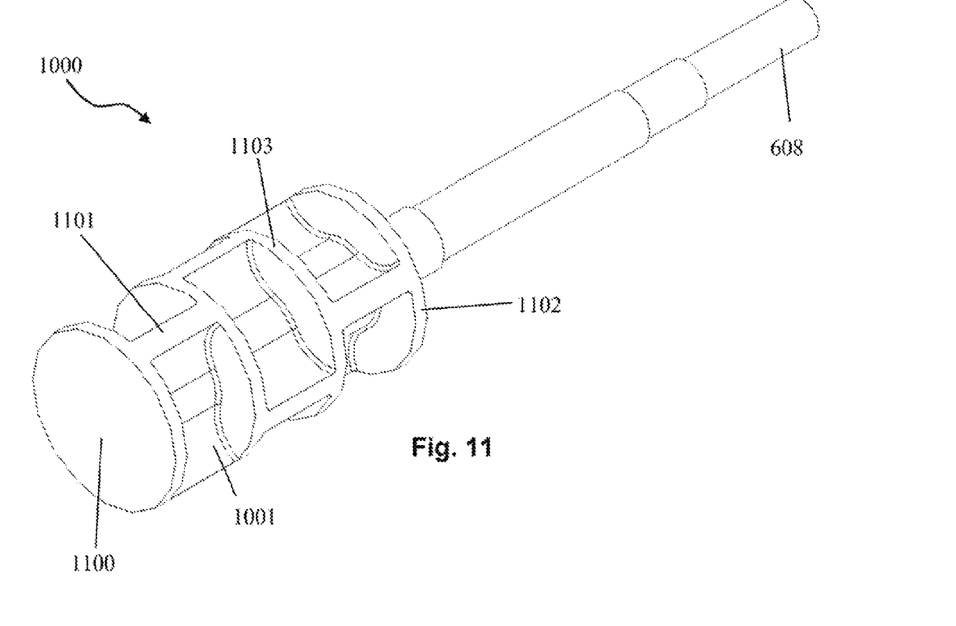
FIG. 11 is a perspective view of the three-segment valve shaft shown in FIG. 10.
Figure 15:
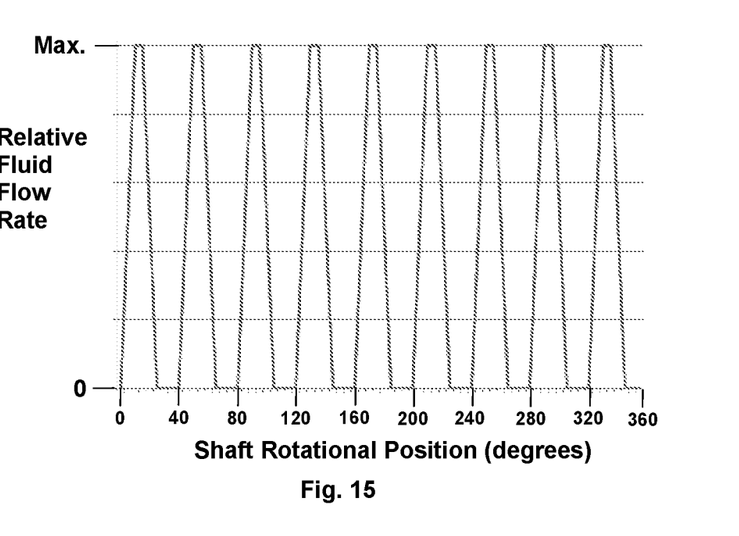
FIG. 15 is a graph showing the relative throughput of an embodiment of a pulse valve with a three-segment valve shaft.

The relative fluid flow rate of fluid passing from the input manifold 606 to the output manifold 607 (vertical axis) for the three-segment pulse valve having a valve shaft as shown in FIG. 11 is shown in FIG. 15 as a function of the rotational position of the valve shaft (horizontal axis). The maximum flow rate is referred to as "Max.", which corresponds to the approximately 5 degrees in each rotation of each segment during which both the input port 604 and corresponding output port 605 are fully open to one of the three conduits in the segment. Each segment has a three-land/conduit configuration with the lands regularly spaced apart by 120 degrees (centre to centre), and the lands in each segment are offset by 40 degrees from those in the adjacent segment(s). The graph of FIG. 15 is the superposition of the graph of FIG. 14 (corresponding to the pulses produced by the first (front) segment 1200a), with the graph of FIG. 14 shifted by 40 degrees to the right (corresponding to the pulses produced by the middle segment 1200b), and again with the graph of FIG. 14 shifted by 80 degrees to the right (corresponding to the pulses produced by the rear segment 1200c).

With a three-segment, three-conduit per segment design, the pulse rate is equal to nine times the drive shaft rotation rate. More generally, with M segments and N lands/conduits, the output pulse rate is equal to M times N times the drive shaft rotation rate, provided that the lands/conduits are configured so that each conduit produces a pulse that is separate from the pulses produced by other conduits, such as in the M=3, N=3 configuration discussed above. Preferably the conduits are configured so that the pulses do not overlap (i.e. the flow rate goes to zero after each pulse), but this is not essential. Compared to a single-segment configuration where the segments have the same radius and width, an M-segment configuration also can handle M times the total flow rate that the single-segment configuration can handle.

Generally, with a six to eight-segment, three-conduit per segment pulse valve, fluid throughput rates of about 1000 to 2000 liters per minute can be sustained, although other configurations can be designed to handle for example, 100, 250, 500 or more than 2000 liters per minute.

The valve shaft and housing are generally made of stainless steel. Other suitably hard materials may alternatively be used, as would be evident to skilled persons.

The cavitation reactor is particularly useful for processing emulsions to "break" them. An emulsion is a mixture of two or more liquids that are normally immiscible (nonmixable or unblendable). Breaking an emulsion refers to separating the components. A Pickering emulsion is an emulsion that is stabilized by solid particles (such as colloidal silica), which adsorb onto the interface between the two phases. The cavitation reactor is particularly well suited to break Pickering emulsions.

Pickering emulsions may be very viscous to the point that it is difficult or impossible to induce cavitation in them. Therefore the first step in breaking a Pickering emulsion is generally to add a diluent to the emulsion to reduce its viscosity. Examples of such fluids include water and oils. By adding a sufficient amount of diluent and mixing it with the emulsion, the viscosity of the emulsion can be reduced sufficiently to allow cavitation to occur. Heating may also be used in addition or alternatively to reduce the viscosity of the emulsion. The diluted emulsion may then be processed by the cavitation reactor, and the cavitation causes the components of the emulsion to separate so that, for example, the solid particles that are denser than the fluids sediment out, and the fluids are separated by their density. The processing is done by passing the diluted emulsion into the input port of the reactor, through the resonance chamber and out the resonance chamber output port, while the valve shaft of the reactor is continuously rotated at a rate sufficient to cause cavitation to occur in the diluted emulsion. For example, if the Pickering emulsion contains oil, water and solid particles denser than water, then after being processed by the reactor, the resulting output will have all the solid particles collected and coagulated at the bottom underneath a layer of relatively pure water, which in turn is under a layer of relatively pure oil. The three components can then be separately removed from the output by well-known methods.

It should be understood that the above-described embodiments of the present invention, particularly, any "preferred" embodiments, are only examples of implementations, merely set forth for a clear understanding of the principles of the invention. Many variations and modifications may be made to the above-described embodiment(s) of the invention as will be evident to those skilled in the art.

Where, in this document, a list of one or more items is prefaced by the expression "such as" or "including", is followed by the abbreviation "etc.", or is prefaced or followed by the expression "for example", or "e.g.", this is done to expressly convey and emphasize that the list is not exhaustive, irrespective of the length of the list. The absence of such an expression, or another similar expression, is in no way intended to imply that a list is exhaustive. Unless otherwise expressly stated or clearly implied, such lists shall be read to include all comparable or equivalent variations of the listed item(s), and alternatives to the item(s), in the list that a skilled person would understand would be suitable for the purpose that the one or more items are listed.

The words "comprises" and "comprising", when used in this specification and the claims, are used to specify the presence of stated features, elements, integers, steps or components, and do not preclude, nor imply the necessity for, the presence or addition of one or more other features, elements, integers, steps, components or groups thereof.

The scope of the claims that follow is not limited by the embodiments set forth in the description. The claims should be given the broadest purposive construction consistent with the description as a whole.

What is claimed is:

1. A pulse valve comprising:
   (a) a housing having a cylindrical bore having an axis extending laterally, the bore being defined by an inner cylindrical surface of the housing, the housing having an outer surface and having at least two pairs of ports, each pair of ports comprising a pulse valve segment input port and a pulse valve segment output port, each of the ports providing a separate fluid communication path between the outer surface of the housing and the cylindrical bore; and
   (b) a multi-segment valve shaft coaxially positioned in the cylindrical bore and having at least front and rear segments, each segment comprising a central portion and at least two lands extending radially therefrom, each land having a surface and having an end proximate to the cylindrical inner surface of the housing, the valve shaft being rotatable inside the cylindrical bore around the bore axis by a drive shaft connected to the central portion of each segment, each pair of adjacent segments being separated by a disk shaped separator having a cylindrical outer surface and being sized so the outer surface of the separator is proximate to the cylindrical inner surface of the housing so that fluid cannot pass between the segments,
   wherein the lands extend laterally so that a fluid conduit is defined by the surfaces of each pair of adjacent lands in each segment and the central portion therebetween, in combination with the housing and the separators,
   wherein adjacent pairs of ports are laterally spaced apart from each other and positioned so that by rotating the valve shaft via the drive shaft, each of the pairs of ports may be brought into fluid communication with each of the fluid conduits of one of the segments,
   wherein the valve shaft is continuously rotatable so that each fluid conduit in each segment moves between a closed position in which the pulse valve segment input port of that segment and the pulse valve segment output port of that segment are not in fluid communication with each other, so that the fluid communication path of that segment is closed, and an open position in which the pulse valve segment input port of that segment and the pulse valve segment output port of that segment are in fluid communication with each other, so that the fluid communication path of that segment is open and fluid flows from the pulse valve segment input port of that segment, through the fluid conduit and out the pulse valve segment output port of that segment.

2. The pulse valve of claim 1, wherein the segments are of like size and configuration, and
   wherein the valve shaft further comprises a third segment positioned between the front and rear segments.

3. The pulse valve of claim 2, wherein the multi-segment valve shaft has exactly three segments, each segment having three regularly spaced lands, the radial positions of the lands of the front segment being offset from the radial positions of the lands in the third segment by about forty degrees, and the radial positions of the lands of the third segment being offset from the radial positions of the lands in the rear segment by about forty degrees.

4. The pulse valve of claim 1, further comprising an output manifold having one manifold input port for each segment, each manifold input port being in fluid communication with one of the pulse valve segment output ports, and the output manifold having a single manifold output port, so that fluid passing out all the pulse valve segment output ports exits the manifold output port, and
   wherein the lands within each segment are regularly spaced so that when fluid is injected into the pulse valve segment input ports, a regularly pulsed fluid flow is produced at the single manifold output port.

5. The pulse valve of claim 1, wherein the multi-segment valve shaft comprises six segments.

* * * * *